United States Patent
Tseng et al.

(10) Patent No.: US 12,449,864 B2
(45) Date of Patent: *Oct. 21, 2025

(54) TWO-STAGE FIXING DEVICE

(71) Applicant: HANWIT PRECISION INDUSTRIES LTD., New Taipei (TW)

(72) Inventors: Ying-Chih Tseng, New Taipei (TW); Ming-De Wu, New Taipei (TW); Ching-Kai Chang, New Taipei (TW)

(73) Assignee: HANWIT PRECISION INDUSTRIES LTD., New Taipei (TW)

( * ) Notice: Subject to any disclaimer, the term of this patent is extended or adjusted under 35 U.S.C. 154(b) by 122 days.

This patent is subject to a terminal disclaimer.

(21) Appl. No.: 18/350,210

(22) Filed: Jul. 11, 2023

(65) Prior Publication Data

US 2025/0021140 A1  Jan. 16, 2025

(51) Int. Cl.
*G06F 1/18* (2006.01)
*H05K 7/14* (2006.01)

(52) U.S. Cl.
CPC ........... *G06F 1/185* (2013.01); *H05K 7/1417* (2013.01)

(58) Field of Classification Search
CPC .............................. G06F 1/185; H05K 7/1417
See application file for complete search history.

(56) References Cited

U.S. PATENT DOCUMENTS

| | | | |
|---|---|---|---|
| 10,234,913 B1 * | 3/2019 | Kho | H05K 3/36 |
| 10,299,397 B1 * | 5/2019 | Chen | H05K 7/1429 |
| 11,018,452 B2 * | 5/2021 | Wu | F16B 2/18 |
| 11,340,665 B2 * | 5/2022 | Chang | G06F 1/186 |
| 11,372,459 B2 * | 6/2022 | Tseng | F16B 2/22 |
| 2024/0414904 A1 * | 12/2024 | Tseng | H05K 7/1417 |

* cited by examiner

*Primary Examiner* — James Wu
(74) *Attorney, Agent, or Firm* — Muncy, Geissler, Olds & Lowe, P.C.

(57) ABSTRACT

A two-stage fixing device includes a seat body mounted on a preset circuit board, and a positioning fastener having a base positioned on the seat body. The base has an integrated first positioning body and second positioning body, which are used for the preset first interface card and preset second interface card plugged into respective preset electrical connectors to be rotated and resisted, and then firmly fixed on the base. By moving the base and an operating portion of a buckle member of the positioning fastener, a first elastic member and a second elastic member loaded on the base can be elastically deformed to recede and tilt up, so that the preset first and second interface cards can be separated from the positioning fastener to achieve rapid positioning and disassembly of multiple interface cards of the present invention.

9 Claims, 9 Drawing Sheets

TWO-STAGE FIXING DEVICE

BACKGROUND OF THE INVENTION

1. Field of the Invention

The present invention relates to fixing devices, especially referring to a two-stage fixing device with a first positioning body and a second positioning body integrally provided on a base, a preset first interface card and a preset second interface card, which are plugged into respective preset electrical connectors, can be rotated and resisted, and then firmly fixed on the base, and by moving the base and an operating portion of a buckle member, a first elastic member and a second elastic member loaded on the base can be elastically deformed to recede and tilt up, so that the preset first interface card and the preset second interface card can be separated from the positioning fastener of the two-stage fixing device, to achieve the purpose of rapid positioning and disassembly of multiple interface cards of the present invention.

2. Description of the Related Art

The rapid development of the electronics industry has doubled the computing performance of computers or servers. In addition to the main components of the motherboard, central processing unit, memory and storage device inside the computer, there are also connectors with a variety of different interfaces on the motherboard to expand the use of various related devices. To expand various related devices, interface cards are used to set a plurality of electronic components and corresponding circuit layouts.

However, general hosts, notebook computers or other electronic devices are mostly limited by the size of the internal space, so users cannot freely configure them. In particular, the space for installing the motherboard and related components in the casings of the C and D sides of the notebook computer is limited by the thickness, and the assembly of motherboard and interface cards cannot be assembled vertically like personal computers. Therefore, how to use the effective space to assemble more interface cards is the key point to be researched and improved by those engaged in this industry.

SUMMARY OF THE INVENTION

Therefore, in view of the above-mentioned problems and deficiencies, the inventor has collected relevant information, evaluated and considered in many ways, and based on years of experience accumulated in this industry, through continuous trial and modification, the inventor designed this new patent with a two-stage fixing device.

It is a main object of the present invention to provide a two-stage fixing device, which comprises a seat body and a positioning fastener. The seat body comprises a bottom plate with a positioning portion at a front end thereof for positioning on a preset circuit board, two side plates respectively extending upwards from two outer walls on both sides of an opposite rear end of the bottom plate, a resisting plate connected between the two side plates, an elastic member mounting space surrounded by the two side plates and resisting plate, and a mounting structure located on an inner surface of each of said two side plates. The positioning fastener comprises a base, a buckle member, a first elastic member, a second elastic member and a pivot. The base comprises a containing groove, two slideways respectively formed on opposite sides of the containing groove, two side guide plates respectively provided above the two slideways, two combining structures respectively extended from respective bottom sides of the two side guide plates for assembling with the two mounting structures of the seat body, a buckle groove and a stop wall respectively formed on opposing front and rear sides of the containing groove, a first positioning body formed above the buckle groove and a positioning unit located on a bottom side of the base for positioning between the two side plates of the seat body. The positioning unit comprises a protruding portion located at a front end thereof, a resisting groove defined above the protruding portion and a second positioning body located in the resisting groove. The first elastic member is arranged at a rear side of the base with one end thereof held against the resisting plate of the seat body. The buckle member comprises a horizontal portion, a thrust portion at a front end of the horizontal portion, an operating portion at an opposing rear end of the horizontal portion, a vertical portion extending downward from a bottom side of the thrust portion and inserted in the containing groove of the base, an adapter plate connected to the vertical portion and a buckle protruded from a front side of the vertical portion corresponding to the buckle groove of the base. The second elastic member is set in the containing groove, having two opposite abutting ends respectively supported against an inner surface of the vertical portion and the stop wall to force the buckle to be fastened in the buckle groove. The pivot is inserted through the adapter plate and the second elastic member, having two opposite positioning ends respectively positioned in the two slideways. With the first positioning body and the second positioning body integrally provided on a base, a preset first interface card and a preset second interface card, which are plugged into respective preset electrical connectors, can be rotated and resisted, and then firmly fixed on the base, and by moving the base and the operating portion of the buckle member, a first elastic member and a second elastic member loaded on the base can be elastically deformed to recede and tilt up, so that the preset first interface card and the preset second interface card can be separated from the positioning fastener of the two-stage fixing device, to achieve the purpose of rapid positioning and disassembly of multiple interface cards of the present invention.

It is another object of the present invention to provide a two-stage fixing device, which comprises a seat body and a positioning fastener. The seat body comprises a bottom plate having a positioning portion at a front end thereof being positioned on a preset circuit board, two side plates respectively extending upwards from two outer walls on both sides of an opposite rear end of the bottom plate, a resisting plate connected between the two side plates, an elastic member mounting space surrounded by the two side plates and the resisting plate, and a mounting structure located on an inner surface of each of the two side plates. The positioning fastener comprises a base, a buckle member, a first elastic member and a second elastic member. The base comprises a containing groove, two combining structures for assembling with the two mounting structures of the seat body, a stop wall formed on a rear side of the containing groove, a first positioning body formed above the buckle groove and a positioning unit located on a bottom side of the base for positioning between the two side plates of the seat body. The positioning unit comprises a protruding portion located at a front end thereof, a resisting groove defined above the protruding portion, and a second positioning body located in the resisting groove. The first elastic member is arranged at a rear side of the base with one end thereof held against the resisting plate of the seat body. The buckle member comprises a horizontal portion, a thrust portion at a front end of the horizontal portion, an operating portion at an opposing rear end of the horizontal portion, a vertical portion extending downward from a bottom side of the thrust portion and inserted in the containing groove of the base and an adapter plate connected to the vertical portion. The second elastic member is set in the containing groove, having two opposite abutting ends respectively supported against an inner surface of the vertical portion and the stop wall. By pressing the operating portion of the positioning fastener and pulling the operating portion of the positioning fastener backward, the first elastic member is pushed to form elastic deformation and the positioning fastener is moved for a distance to drive a preset first interface card and a preset second interface card on the preset circuit board to position or release the position on the positioning fastener. In this way, it achieves the purpose of rapid positioning and disassembly of multiple interface cards of the present invention.

Preferably, the two mounting structures of the seat body each comprise a positioning projection respectively protruding from an inner surface of one respective side plate, and a stop arm located between the positioning projection and the resisting plate and extending to both sides. The stop arm is protrudingly provided with a stop block in the direction of the positioning projection. The two combining structures of the base each comprise a protruding combination block protruding downward, and a positioning groove formed between one respective side guide plate and the combination block for one respective positioning projection to be positioned. The positioning unit of the positioning fastener further comprises two buckle blocks protrudingly provided on two opposite sides of an opposite rear end thereof opposite to the protruding portion and respectively accommodated at a bottom side of the two stop arms. The buckle member further comprises two limiting blocks respectively extending from the horizontal portion toward two opposite sides of the adapter plate for limiting the respective abutting ends of the second elastic member, and a limiting space respectively formed between a relative inner side of each of the limiting blocks and the vertical portion for accommodating the abutting ends of the second elastic member.

Preferably, the buckle member further comprises a shaft hole extending through the adapter plate for the pivot to pass through, so that the two positioning ends of the pivot are respectively positioned in the two slideways of the base.

Preferably, the second elastic member is a torsion spring made of a metal wire by winding. The second elastic member comprises two parallel positioning rings formed in the middle, a passageway formed through each of the positioning rings for the pivot to pass through, a deformation portion bent at two ends and extended from the two positioning rings at one side for resisting against the stop wall, and two abutting ends respectively extended from the two positioning rings at an opposite side for abutting against the inner surface of the vertical portion of the buckle member.

Preferably, the first positioning body of the base is composed of a semicircular arc-shaped sheet. The bottom plate of the seat body is positioned on a preset circuit board through the positioning portion, and a preset first interface card and a preset second interface card are plugged into respective preset electrical connectors provided on the preset circuit board. After respectively rotating and pushing against the thrust portion of the buckle member, a suspended first resisting end of the preset first interface card is inserted in and resisted by the first positioning body, and a suspended second resisting end of the preset second interface card is inserted in and resisted by the second positioning body.

DETAILED DESCRIPTION OF THE PREFERRED EMBODIMENT

Please refer to FIGS. 1, 2, 3, and 4, which are the three-dimensional appearance view, another three-dimensional appearance view, three-dimensional exploded view, and another three-dimensional exploded view of the two-stage fixing device of the present invention. The two-stage fixing device of the present invention mainly comprises a seat body 1 and a positioning fastener 2, and the connection relationship of the aforementioned components is as follows:

The seat body 1 comprises a bottom plate 11 with a positioning portion 111 at a front end thereof, a positioning hole 1110 located on the positioning portion 111 for a preset fastener (not shown) to be penetrated and fixed, two side plates 112 respectively extending upwards from two outer walls on both sides of an opposite rear end of the bottom plate 11, a resisting plate 1121 connected between the two side plates 112, and an elastic member mounting space 110 surrounded by the two side plates 112 and the resisting plate 1121, and a mounting structure 12 located on an inner surface of each of the two side plates 112. The two mounting structures 12 each comprise a positioning projection 121 protruding from the inner surface of the respective side plate 112, and a stop arm 122 located between the positioning projection 121 and the resisting plate 1121 and extending to both sides. The stop arm 122 is protrudingly provided with a stop block 1221 in the direction of the positioning projection 121.

The positioning fastener 2 comprises a base 21, a buckle member 22, a first elastic member 2151, a second elastic member 23 and a pivot 24. The base 21 comprises a containing groove 210, two slideways 2101 respectively formed on opposite sides of the containing groove 210, two side guide plates 211 respectively provided above the two slideways 2101, a finger block 2111 protruded from an outer wall of each of the two side guide plates 211, two combining structures 212 respectively extended from respective bottom sides of the two side guide plates 211 for assembling with the two mounting structures 12, each combining structure 212 comprising a protruding combination block 2121 and a positioning groove 2120 formed between the side guide plates 211 and the combination block 212 for the positioning projection 121 to be positioned, a buckle groove 2102 and a stop wall 2103 respectively formed on opposing front and rear sides of the containing groove 210, a first positioning body 213 formed above the buckle groove 2102, a positioning unit 214 located on a bottom side of the base 21 for positioning between the two side plates 112 of the seat body 1, an elastic member mounting groove 215 located on a rear side of the base 21 corresponding to the position of the elastic member mounting space 110 for the insertion of the first elastic member 2151 to let one end of the first elastic member 2151 to be held against the resisting plate 1121, and a cover plate 216 located on the rear side of the base 21 for stopping against a top of the resisting plate 1121. The positioning unit 214 comprises a protruding portion 2141 located at a front end thereof, a resisting groove 2140 defined above the protruding portion 2141, a second positioning body 2142 located in the resisting groove 2140, and two buckle blocks 2143 protrudingly provided on two opposite sides of an opposing rear end thereof opposite to the protruding portion 2141.

The buckle member 22 comprises a horizontal portion 221, a thrust portion 2211 at a front end of the horizontal portion 221, an operating portion 2212 at an opposing rear end of the horizontal portion 221, a vertical portion 222 extending downward from a bottom side of the thrust portion 2211 for inserting in the containing groove 210 of the base 21, an adapter plate 223 connected to the vertical portion 222, and a buckle 2221 protruded from a front side of the vertical portion 222 corresponding to the buckle groove 2102 of the base 21.

The second elastic member 23 is set in the containing groove 210 with two opposite ends thereof respectively supported against an inner surface of the vertical portion 222 and the stop wall 2103. Through the pushing force of the second elastic member 23, the buckle 2221 is firmly fastened in the buckle groove 2102.

The pivot 24 is inserted through the adapter plate 223 and the second elastic member 23, and two opposite positioning ends 241 of the pivot 24 are respectively positioned in the two slideways 2101.

The two side guide plates 211 of the above-mentioned base 21 each have a beveled edge 2112 that forms a smooth downward arc to the rear side. The first positioning body 213 of the base 21 is composed of a semicircular arc-shaped sheet. The bottom plate 11 of the seat body 1 is positioned on a preset circuit board 3 through the positioning portion 111, and a preset first interface card 4 and a preset second interface card 5 (not shown) are plugged into respective preset electrical connectors provided on the preset circuit board 3. After respectively rotating and pushing against the thrust portion 2211 of the buckle member 22, a suspended first resisting end 41 of the preset first interface card 4 is inserted in and resisted by the first positioning body 213, and a suspended second resisting end 51 of the preset second interface card 5 is inserted in and resisted by the second positioning body 2142, thereby completing the positioning of the preset first interface card 4 and the preset second interface card 5 in the present invention.

The above-mentioned buckle member 22 further comprises a guide slope 2213 located on a top side of the thrust portion 2211 in a circular arc shape for guiding the preset first interface card 4 and the preset second interface card 5 to rotate downward, a limiting surface 2214 formed on an opposing bottom side of the thrust portion 2211, a sliding surface 2215 formed on a bottom side of the operating portion 2212 opposite to the thrust portion 2211, two limiting blocks 224 respectively extending from the horizontal portion 221 toward two opposite sides of the adapter plate 223 for limiting respective abutting ends 231 of the second elastic member 23, a limiting space 2240 respectively formed between a relative inner side of each of the limiting blocks 224 and the vertical portion 222 for accommodating the abutting ends 231 of the second elastic member 23, and a shaft hole 2230 extending through the adapter plate 223 for the pivot 24 to pass through. After the pivot 24 is inserted through the shaft hole 2230, the two positioning ends 241 of the pivot 24 are respectively positioned in the two slideways 2101 of the base 21.

Figure 1:
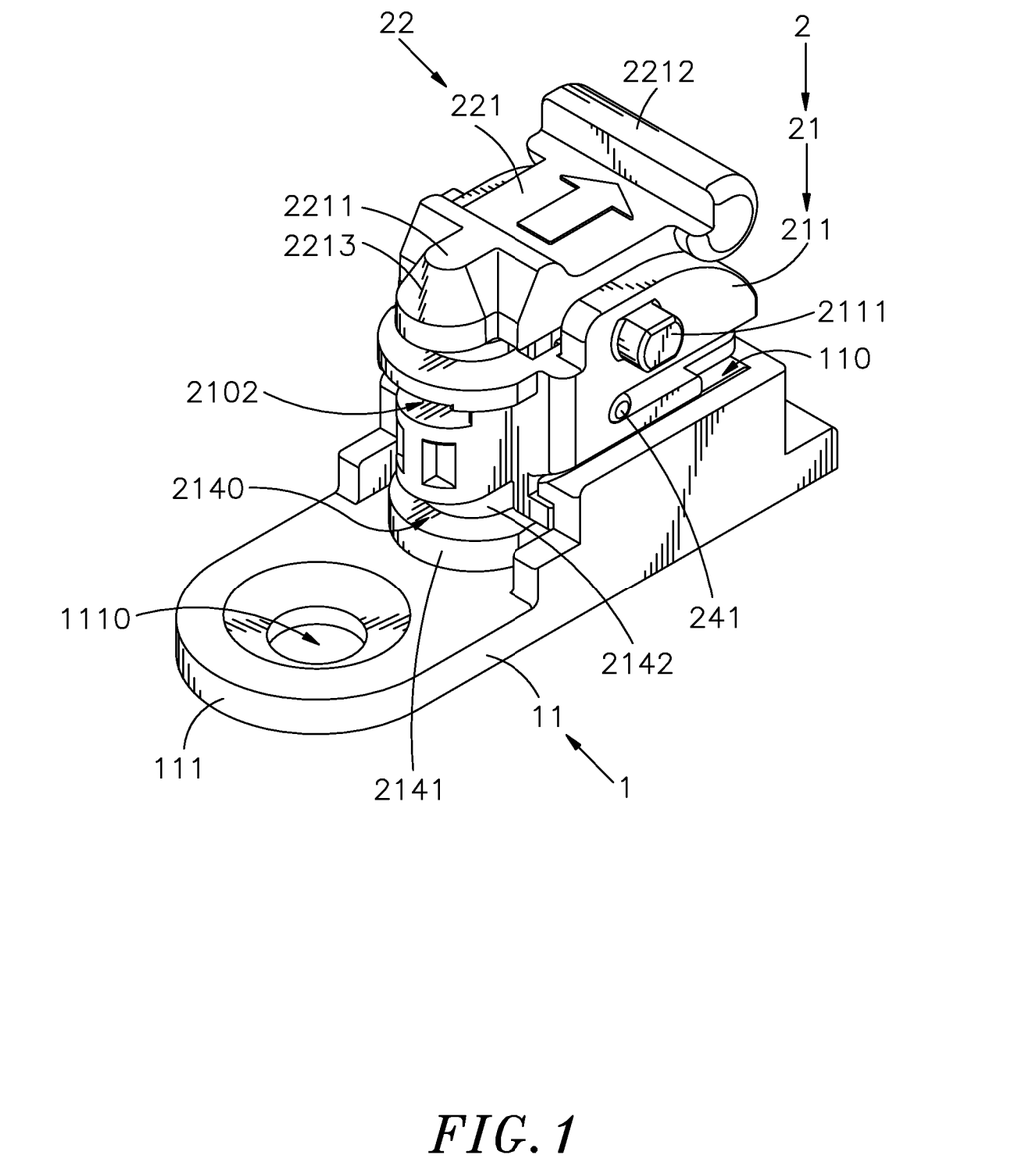
FIG. 1 is a three-dimensional appearance view of the two-stage fixing device of the present invention.
Figure 2:
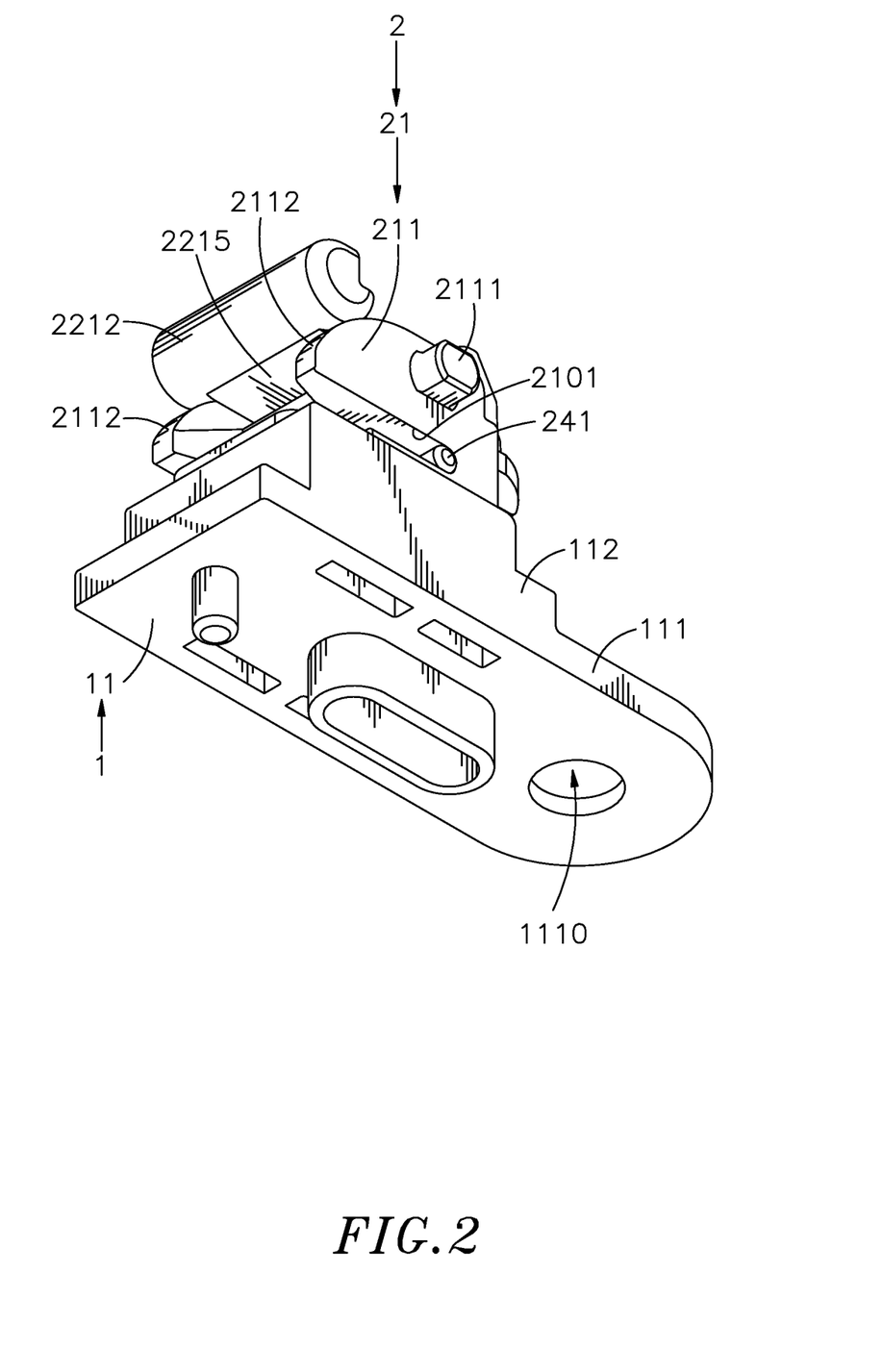
FIG. 2 is another three-dimensional appearance view of the two-stage fixing device of the present invention.
Figure 3:
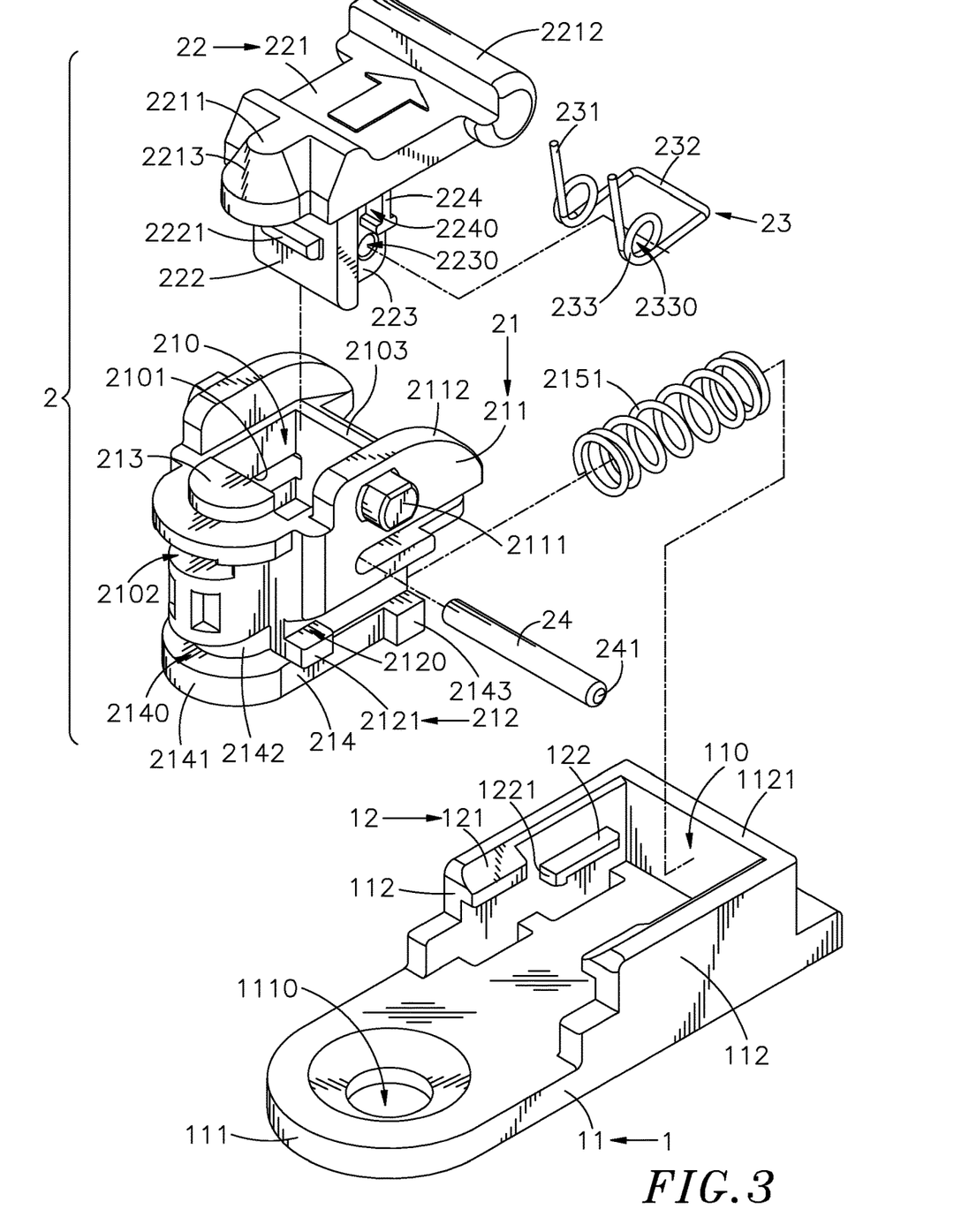
FIG. 3 is a three-dimensional exploded view of the two-stage fixing device of the present invention.
Figure 4:
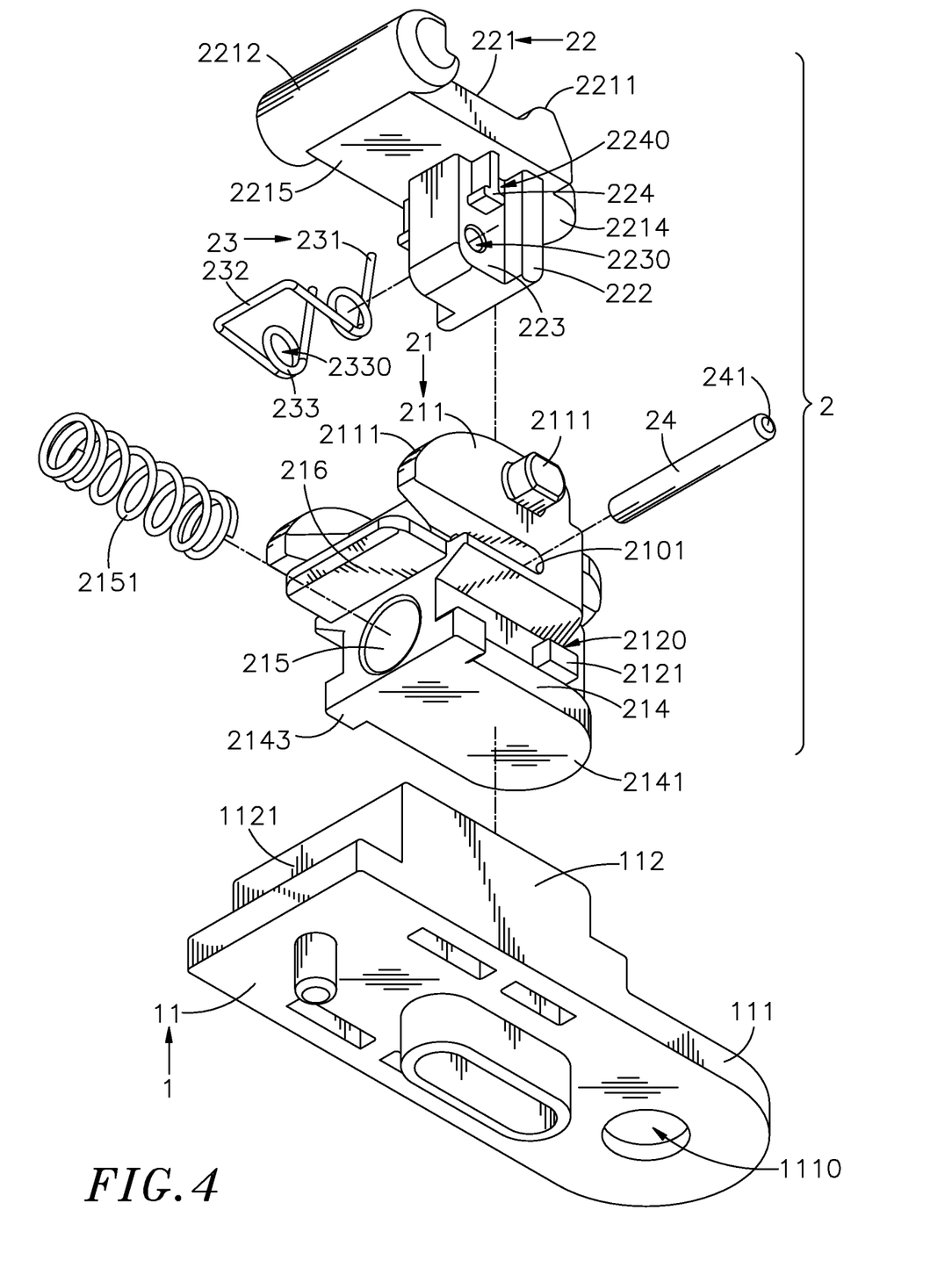
FIG. 4 is another three-dimensional exploded view of the two-stage fixing device of the present invention.

The above second elastic member 23 is a torsion spring. The second elastic member 23 is made of a metal wire by winding, comprising two parallel positioning rings 233 formed in the middle, a passageway 2330 formed through each of the positioning rings 233 for the pivot 24 to pass through, a deformation portion 232 bent at two ends and extended from the two positioning rings 233 at one side for resisting against the stop wall 2103, and two abutting ends 231 respectively extended from the two positioning rings 233 at an opposite side for abutting against the inner side of the vertical portion 222 of the buckle member 22.

When the present invention is intended to be assembled, first assemble the positioning portion 111 of the seat body 1 on the preset circuit board 3, and then set the positioning unit 214 of the base 21 between the two side plates 112 of the bottom plate 11 and respectively position the positioning projections 121 of the mounting structures 12 on the two side plates 112 in the positioning grooves 2120 formed between the combining structures 212 and the base 21, so that the two buckle blocks 2143 of the positioning unit 214 are respectively accommodated at the bottom of the two stop arms 122, the first elastic member 2151 in the elastic member mounting groove 215 on the rear side of the base 21 is supported on the resisting plate 1121, and the buckle blocks 2143 on both sides of the base 21 pushed by the first elastic member 2151 are blocked by the stop blocks 1221 of the stop arms 122 and cannot be pushed out of the seat body 1. Then extend the two abutting ends 231 of the second elastic member 23 into the limiting spaces 2240 on both sides of the adapter plate 223 of the buckle member 22, and make a limit on the two abutting ends 231 through the limiting blocks 224, and then make the two passageways 2330 of the second elastic member 23 face the shaft hole 2230 of the adapter plate 223 at the same time. Then press the vertical portion 222 of the buckle member 22, the adapter plate 223 and the second elastic member 23 from top to bottom into the containing groove 210 of the base 21 at the same time, so that the abutting ends 23 of the second elastic member 23 are held against the inner side of the vertical portion 222 and the deformation portion 232 is held against the stop wall 2103, and the two passageways 2330 of the second elastic member 23 and the shaft hole 2230 of the adapter plate 223 are aligned between the two slideways 2101 of the base 21 at the same time. Then the pivot 24 runs through the two slideways 2101, the two passageways 2330 and the shaft hole 2230, and the two positioning ends 241 of the pivot 24 are positioned in the two slideways 2101 to form a position, so as to complete the assembly of the two-stage fixing device.

Figure 5:
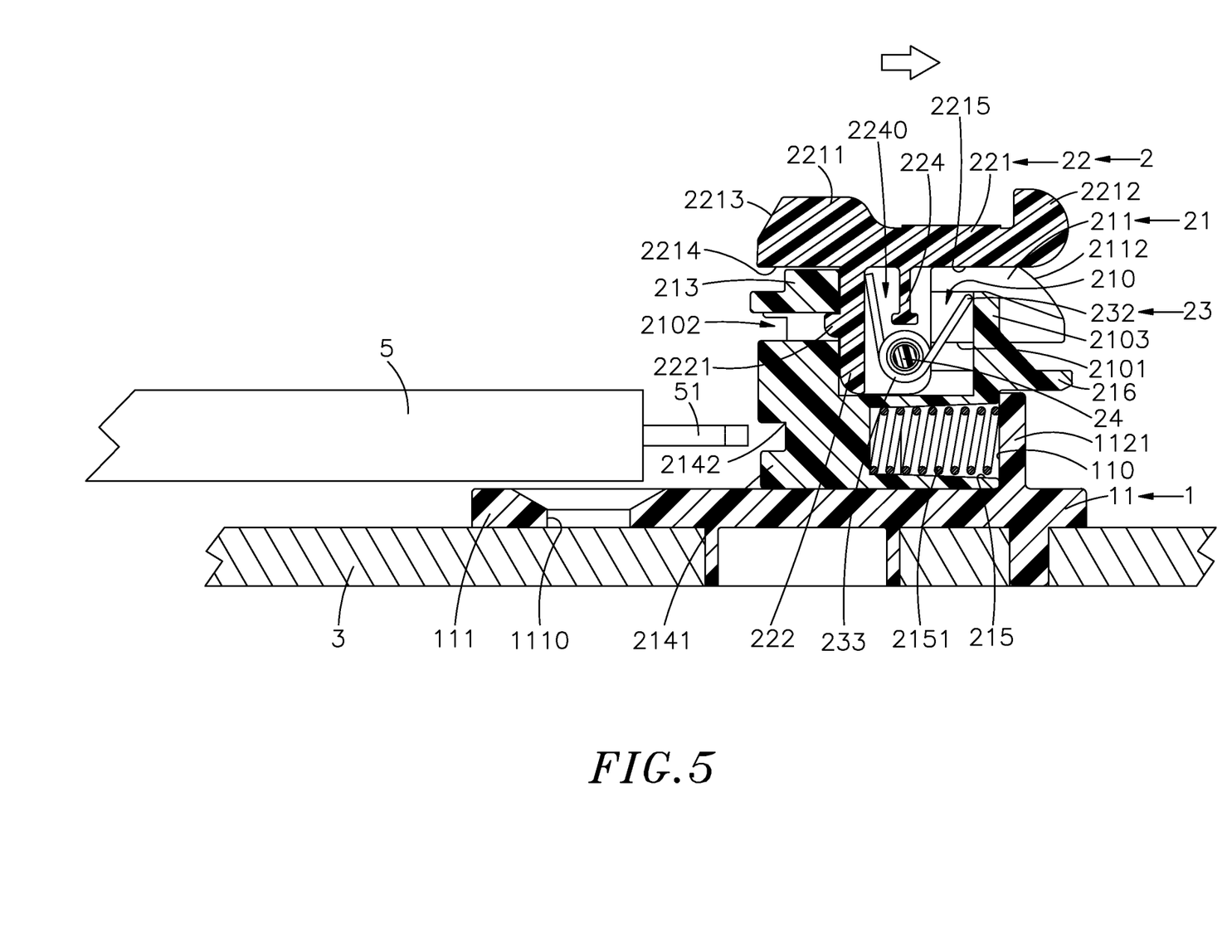
FIG. 5 is a schematic diagram of the assembly action of the two-stage fixing device of the present invention (I).
Figure 6:
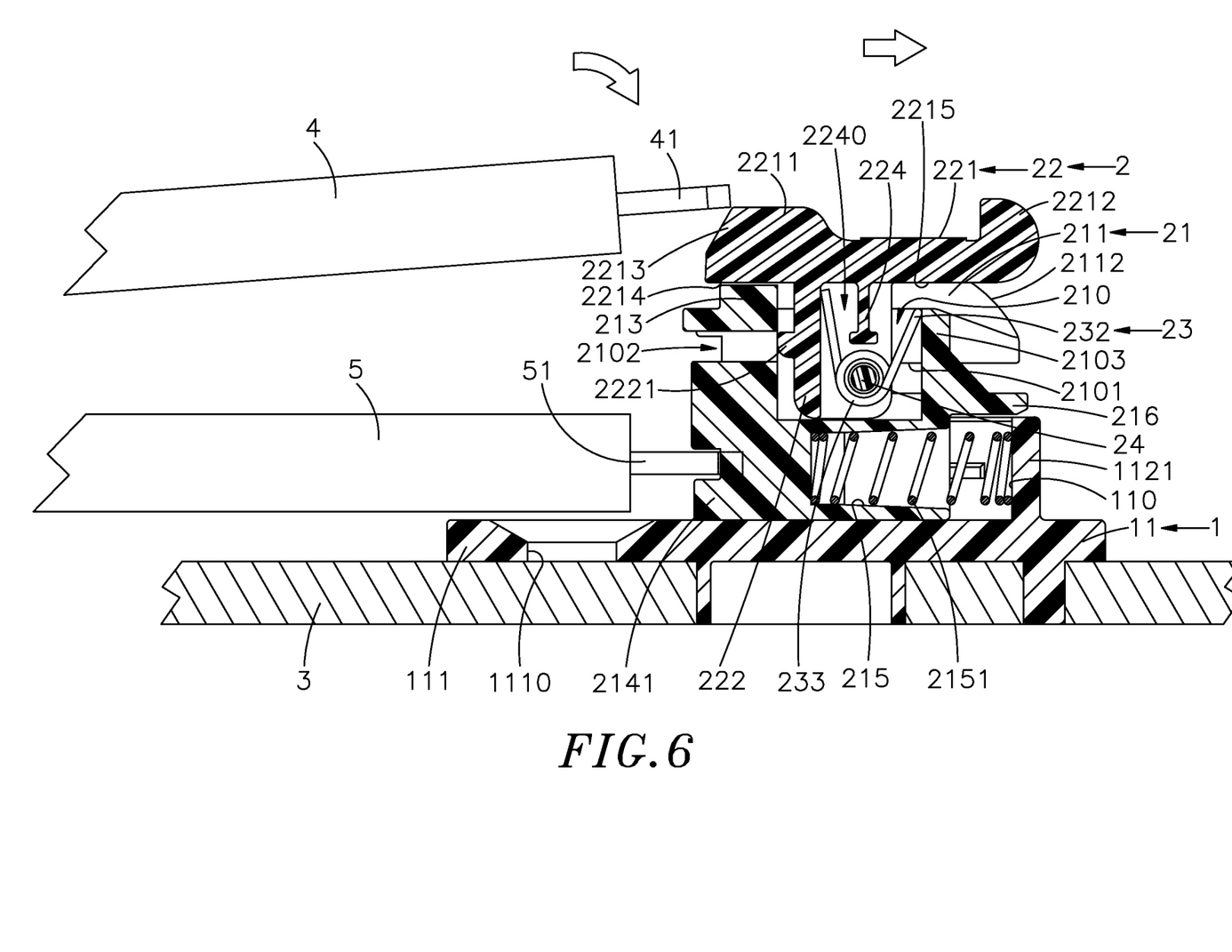
FIG. 6 is a schematic diagram of the assembly action of the two-stage fixing device of the present invention (II).
Figure 7:
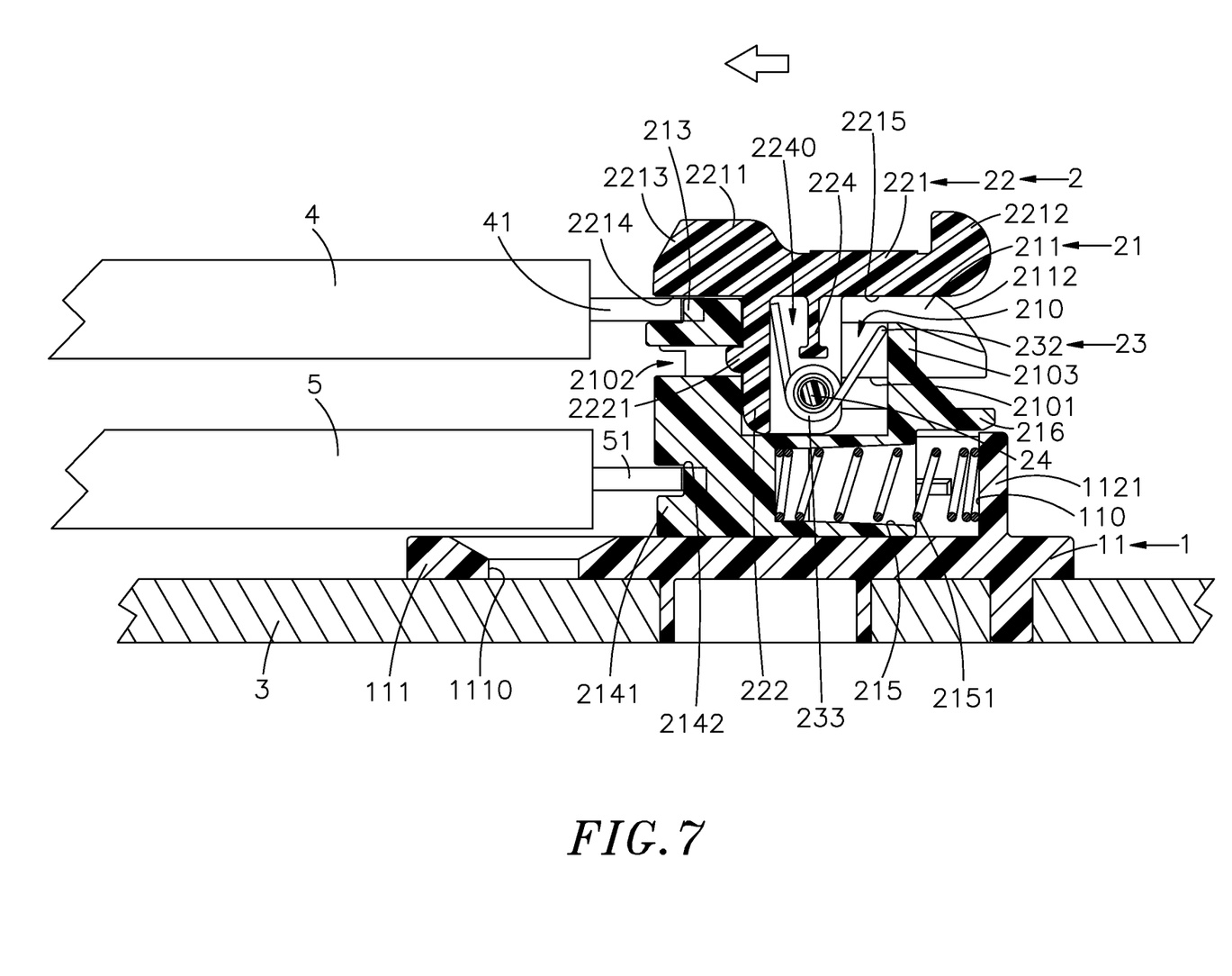
FIG. 7 is a schematic diagram of the assembly action of the two-stage fixing device of the present invention (III).

Please refer to FIGS. 5, 6, and 7, which are schematic diagrams of assembly actions (I), schematic diagrams of assembly actions (II) and schematic diagrams of assembly actions (III) of the two-stage fixing device of the present invention. It can be clearly seen from the figures that in practical application of the present invention, the preset first interface card 4 and the preset second interface card 5 need to be plugged into the docking spaces (not shown) in the preset electrical connectors provided on the preset circuit board 3, and then generate electrical connection. When the first resisting end 41 and the second resisting end 51 extending from the preset first interface card 4 and the preset second interface card 5 are intended to be positioned in the positioning fastener 2 on the preset circuit board 3, it is necessary to use the preset electrical connectors as the rotation axis first, and rotate the preset first interface card 4 and the preset second interface card 5 to the positions of the thrust portion 2211 and the protruding portion 2141. By pulling the finger blocks 2111 on the outer wall surfaces of the two side guide plates 211, the base 21 is pushed toward the resisting plates 1121, thereby driving the first elastic member 2151 in the base 21 to undergo an elastic compression deformation. After the second resisting end 51 of the second interface card 5 is in alignment with the resisting groove 2140 of the positioning unit 214, the finger blocks 2111 are released, so that the first elastic member 2151 pushes the base 21 back to its original position through the force of elastic recovery, and then the second resisting end 51 extends into the resisting groove 2140 and resists on the second positioning body 2142 to form a resisting position (as shown in FIGS. 5 and 6). The thrust portion 2211 will shrink back under the horizontal stress of the preset first interface card 4 and drive the pivot 24 to move in the two slideways 2101 toward the rear side of the base 21 to make the second elastic member 23 generate elastic compression deformation, so that the first resisting end 41 of the preset first interface card 4 is turned vertically downward into the bottom side of the limiting surface 2214 of the thrust portion 2211. And there is a first positioning body 213 in the form of a semi-circular arc sheet at the base 21 corresponding to the limiting surface 2214, and the first positioning body 213 provides the first resisting end 41 of the preset first interface card 4 for a resisting positioning (as shown in FIGS. 6 and 7). At the same time, the buckle member 22 releases the resisting force of the preset first interface card 4 to make the second elastic member 23 generate an elastic reset force, thereby driving the thrust portion 2211, the second elastic member 23 and the pivot 24 to return to their original positions. In this way, the top surface of the preset first interface card 4 is limited by the limiting surface 2214 of the buckle member 22, and the side and bottom surfaces of the preset first interface card 4 are accommodated at the periphery of the first positioning body 213. Through the foregoing, the positioning of the preset first interface card 4 and the preset second interface card 5 in the two-stage fixing device is completed.

In addition, the base 21 can also be moved by pressing the operating portion 2212 of the buckle member 22 and pulling it backward to drive the base 21 to move a distance, so that the first elastic member 2151 exhibits an elastic compression deformation. Such simple equivalent changes and modifications do not limit the protection scope of the present invention, and such simple equivalent changes and modifications should still be included in the patent scope covered by the present invention.

Figure 8:
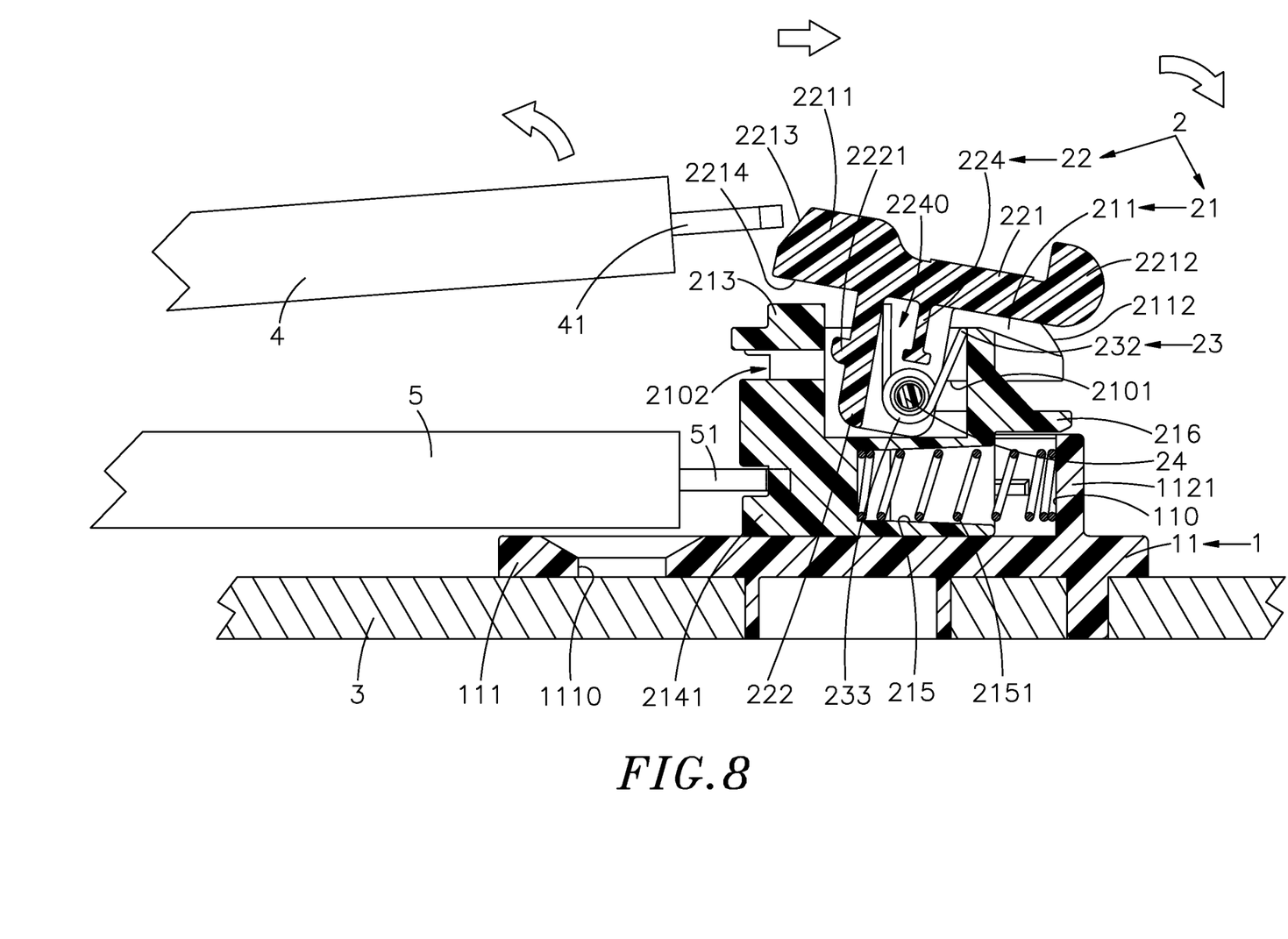
FIG. 8 is a schematic diagram of the unbuckle action of the two-stage fixing device of the present invention (I).
Figure 9:
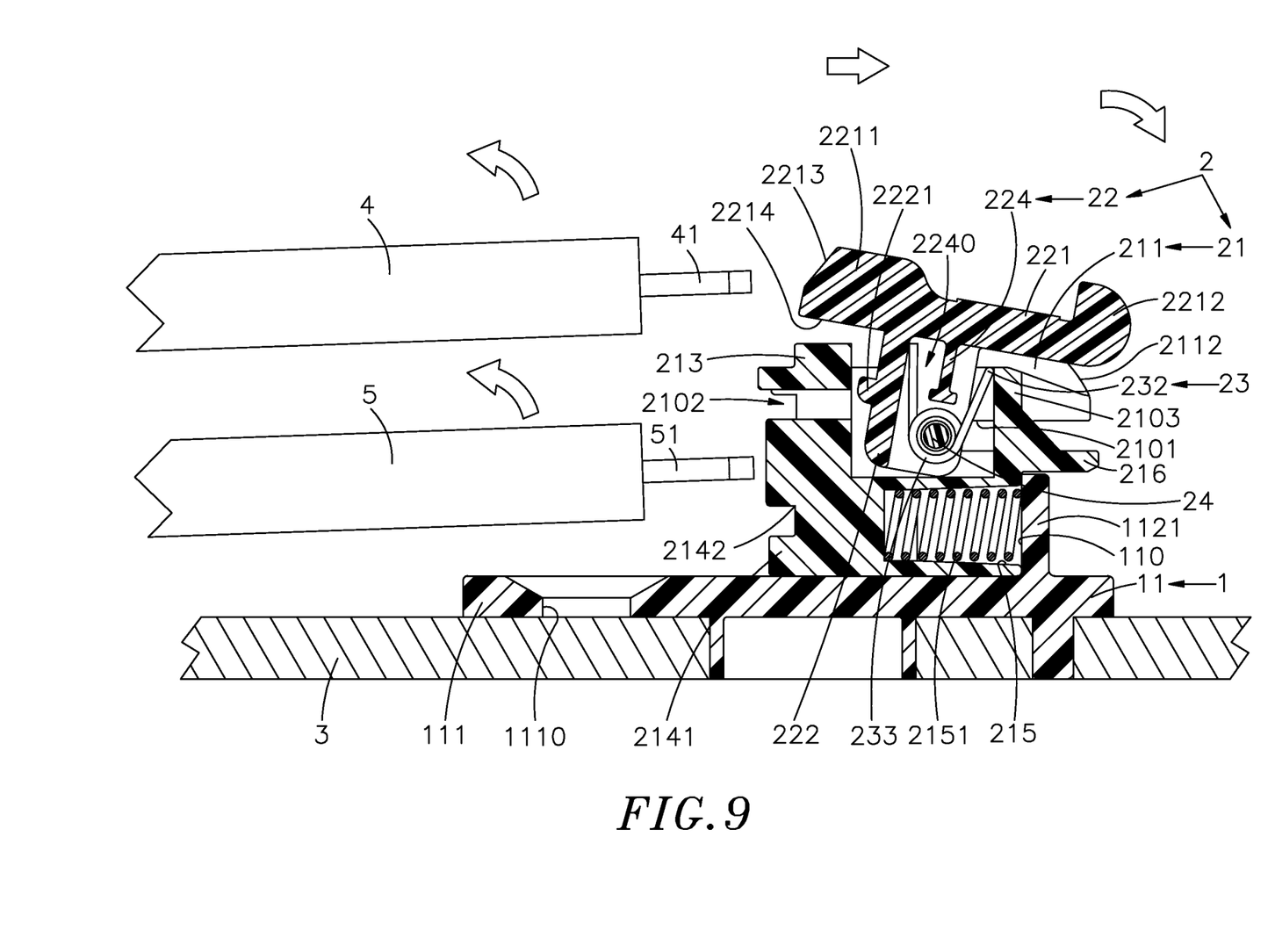
FIG. 9 is a schematic diagram of the unbuckle action of the two-stage fixing device of the present invention (II).

Please refer to FIGS. 8 and 9, which are schematic diagram of the unbuckle action (I) and schematic diagram of the unbuckle action (II) of the two-stage fixing device of the present invention. It can be clearly seen from the figures that when the positioning fastener 2 is to be released from the preset first interface card 4 and the preset second interface card 5, first press on the operating portion 2212 of the buckle member 22 towards the rear side of the base 21 to separate the buckle 2221 from the buckle groove 2102 of the base 21. After the pivot 24 moves a predetermined distance in the slideways 2101, apply force to make the operating portion 2212 rotate downward around the pivot 24, and make the second elastic member 23 generate a great amount of compression. Thus, the sliding surface 2215 on the bottom side of the operating portion 2212 slides toward the rear side of the base 21 along the beveled edges 2112 of the two side guide plates 211. At this time, the buckle member 22 generates a predetermined inclination angle and makes the thrust portion 2211 upward, so that the preset first interface card 4 is affected by the elastic recovery force of the preset conductive terminals in the preset electrical connector, and the end surface of the preset first interface card 4 away from the preset electrical connector is upturned, thereby causing the first resisting end 41 of the preset first interface card 4 to rotate upward and to break away from the first positioning body 213 and the thrust portion 2211. After the preset first interface card 4 is detached, apply force to the operating portion 2212 and pull it backward, thereby driving the first elastic member 2151 in the base 21 to undergo an elastic compression deformation. The preset second interface card 5 is affected by the elastic recovery force of the preset conductive terminals in the preset electrical connector, so that the end surface of the preset second interface card 5 away from the preset electrical connector is upturned, and then the second resisting end 51 of the preset second interface card 5 twist upwards to break away from the second positioning body 2142 (as shown in FIG. 9). The preset first interface card 4 and the preset second interface card 5 can then be detached and taken out from the preset electrical connectors. Then by removing the force applied to the operating portion 2212 of the buckle member 22 and the finger blocks 2111 of the two side guide plates 211, the thrust portion 2211, the second elastic member 23, the pivot 24 and the base 21 are returned to their original positions, and the buckle 2221 of the buckle member 22 is buckled into the buckle groove 2102 of the base 21 to achieve the purpose of separating the preset first interface card 4 and the preset second interface card 5. In addition, the unlocking between the positioning fastener 2 and the preset second interface card 5 can also be achieved by pulling the finger blocks 2111 on the outer wall surfaces of the two side guide plates 211 to push the base 21 toward the resisting plate 1121 and push the first elastic member 2151 to form an elastic deformation, so that the positioning fastener 2 moves a distance toward the resisting plate 1121, and the preset second interface card 5 set in the buckle member 22 will break away from the resistance of the first positioning body 213 and the second positioning body 2142 after the positioning fastener 2 is displaced, so as to achieve the effect of separating the preset second interface card 5.

The present invention has the following advantages. It provides a rapid positioning and dismounting structure for a plurality of interface cards. Especially, it refers to the first positioning body 213 and the second positioning body 2142 integrally provided on the base 21 are used to abut against the suspending first resisting end 41 of the preset first interface card 4 and the suspending second resisting end 51 of the preset second interface card 5, and the base 21, the preset first interface card 4 and the preset second interface card 5 are stably positioned by the elastic push of the first elastic member 2151 and the second elastic member 23, and by moving the base 21 and the operating portion 2212, the first elastic member 2151 and the second elastic member 23 can be elastically deformed to recede and tilt up, so that the preset first interface card 4 and the preset second interface card 5 can be separated from the positioning fastener 2, to achieve the purpose of rapid positioning and disassembly of multiple interface cards of the present invention.

The above description is only a preferred embodiment of the present invention, and does not limit the patent scope of the present invention. Therefore, all simple modifications and equivalent structural changes made by using the contents of the description and drawings of the present invention should be included in the patent scope of the present invention in the same way.

What the invention claimed is:

1. A two-stage fixing device, comprising:
a seat body comprising a bottom plate having a positioning portion at a front end thereof being positioned on a preset circuit board, two side plates respectively extending upwards from two outer walls on both sides of an opposite rear end of said bottom plate, a resisting plate connected between said two side plates, an elastic member mounting space surrounded by said two side plates and said resisting plate, and a mounting structure located on an inner surface of each of said two side plates; and
a positioning fastener comprising a base, a buckle member, a first elastic member and a second elastic member, said base comprising a containing groove, two combining structures for assembling with said two mounting structures of said seat body, a stop wall formed on a rear side of said containing groove, a first positioning body formed above a buckle groove and a positioning unit located on a bottom side of said base for positioning between said two side plates of said seat body, said positioning unit comprising a protruding portion located at a front end thereof, a resisting groove defined above said protruding portion and a second positioning body located in said resisting groove, said first elastic member being arranged at a rear side of said base with one end thereof held against said resisting plate of said seat body, said buckle member comprising a horizontal portion, a thrust portion at a front end of said horizontal portion, an operating portion at an opposing rear end of said horizontal portion, a vertical portion extending downward from a bottom side of said thrust portion and inserted in said containing groove of said base and an adapter plate connected to said vertical portion, said second elastic member being set in said containing groove and having two opposite abutting ends respectively supported against an inner surface of said vertical portion and said stop wall; and
wherein by pressing said operating portion of said positioning fastener and pulling said operating portion of said positioning fastener backward, said first elastic member is pushed to form elastic deformation and said positioning fastener is moved for a distance to drive a preset first interface card and a preset second interface card on said preset circuit board to position or release the position on said positioning fastener.

2. The two-stage fixing device as claimed in claim 1, wherein said two mounting structures of said seat body each comprise a positioning projection respectively protruding from an inner surface of one respective said side plate and a stop arm located between said positioning projection and said resisting plate and extending to both sides, said stop arm being protrudingly provided with a stop block in the direction of said positioning projection; said two combining structures of said base each comprise a protruding combination block protruding downward and a positioning groove formed between one respective side guide plate and said combination block for one respective said positioning projection to be positioned; said positioning unit of said positioning fastener further comprises two buckle blocks protrudingly provided on two opposite sides of an opposite rear end thereof opposite to said protruding portion and respectively accommodated at a bottom side of said two stop arms.

3. The two-stage fixing device as claimed in claim 1, wherein said seat body further comprises a positioning hole located on said positioning portion for a preset fastener to be penetrated and fixed.

4. The two-stage fixing device as claimed in claim 1, wherein said positioning fastener further comprises a finger block protruded from an outer wall of each of said two side guide plates for people to pull.

5. The two-stage fixing device as claimed in claim 1, wherein said buckle member further comprises a guide slope located on a top side of said thrust portion in a circular arc shape for guiding said preset first interface card to rotate downward, a limiting surface formed on an opposing bottom side of said thrust portion, and a sliding surface formed on a bottom side of said operating portion opposite to said thrust portion.

6. The two-stage fixing device as claimed in claim 1, wherein said buckle member further comprises two limiting blocks respectively extending from said horizontal portion toward two opposite sides of said adapter plate for limiting the respective abutting ends of said second elastic member, and a limiting space respectively formed between a relative inner side of each of said limiting blocks and said vertical portion for accommodating the abutting ends of said second elastic member.

7. The two-stage fixing device as claimed in claim 1, wherein said base further comprises two slideways respectively formed on opposite sides of said containing groove; said buckle member further comprises a shaft hole extending through said adapter plate; said positioning fastener further comprises a pivot inserted through said shaft hole on said adapter plate and said second elastic member, said pivot having two opposite positioning ends respectively positioned in said two slideways.

8. The two-stage fixing device as claimed in claim 7, wherein said second elastic member is a torsion spring made of a metal wire by winding, said second elastic member comprising two parallel positioning rings formed in the middle, a passageway formed through each of said positioning rings for said pivot to pass through, a deformation portion bent at two ends and extended from said two positioning rings at one side for resisting against said stop wall, and two abutting ends respectively extended from said two positioning rings at an opposite side for abutting against the inner surface of said vertical portion of said buckle member.

9. The two-stage fixing device as claimed in claim 1, wherein said first positioning body of said base is composed of a semicircular arc-shaped sheet; said bottom plate of said seat body is positioned on a preset circuit board through said positioning portion, and said preset first interface card and said preset second interface card are plugged into respective preset electrical connectors provided on said preset circuit board, and after respectively rotating and pushing against said thrust portion of said buckle member, a suspended first resisting end of said preset first interface card is inserted in and resisted by said first positioning body, and a suspended second resisting end of said preset second interface card is inserted in and resisted by said second positioning body.

* * * * *